United States Patent [19]

Nishino et al.

[11] Patent Number: 5,032,868

[45] Date of Patent: Jul. 16, 1991

[54] ELECTROPHOTOGRAPHIC COPYING APPARATUS FOR COPYING AN ORIGINAL PLACED ON AN ORIGINAL SUPPORTING TABLE AND FOR COPYING AN ORIGINAL FROM A BOARD SURFACE

[75] Inventors: Fumio Nishino, Tokyo; Tamotsu Okada, Kawasaki; Fumio Asano, Tokyo; Koyokazu Namekata, Yokohama, all of Japan

[73] Assignee: Canon Kabushiki Kaisha, Tokyo, Japan

[21] Appl. No.: 423,745

[22] Filed: Oct. 19, 1989

Related U.S. Application Data

[63] Continuation of Ser. No. 118,885, Nov. 10, 1987, abandoned.

[30] Foreign Application Priority Data

| Nov. 12, 1986 | [JP] | Japan | 61-174508 |
| Nov. 12, 1986 | [JP] | Japan | 61-270407 |
| Nov. 17, 1986 | [JP] | Japan | 61-176536 |

[51] Int. Cl.$^5$ ............................................. G03G 21/00
[52] U.S. Cl. ..................................... 355/202; 355/271
[58] Field of Search ................. 355/202, 232, 233, 271

[56] References Cited

U.S. PATENT DOCUMENTS

| 4,462,674 | 7/1984 | Nishikawa | 355/232 |
| 4,627,703 | 12/1986 | Suzuki et al. | 355/271 |
| 4,648,706 | 3/1987 | Shibasaki et al. | 355/232 |
| 4,687,318 | 8/1987 | Shibasaki et al. | 355/233 |
| 4,702,586 | 10/1987 | Saito et al. | 355/232 |
| 4,733,271 | 3/1988 | Arai | 355/202 |
| 4,752,803 | 6/1988 | Sakurai et al. | 355/202 |

Primary Examiner—Fred L. Braun
Attorney, Agent, or Firm—Fitzpatrick, Cella, Harper & Scinto

[57] ABSTRACT

An electrophotographic copying apparatus is provided with a first body and a second body, the first body having a photosensitive member, a light source for exposing an original, an original supporting table movable relative to the light source with the original supported thereon, and a first optical system for projecting a first image information light reflected from the original onto the photosensitive member. The second body has a second optical system for projecting a second image information light onto the photosensitive member in the first body. Two copying modes are provided: a first mode for copying by the first image information light, and a second mode for copying by the second image information light. In the second mode, a controller positions a shutter member for blank exposure in the optical path in its retracted position prior to the copying in the second mode. Thus, solving the optical problems on the copying apparatus side and on the apparatus side for operating the recording medium and the higher functionalization of an optical system and/or the movement range of the movable original supporting table is changed during the original copying and during the copying of the recording medium to thereby enable the efficient use of the space.

5 Claims, 13 Drawing Sheets

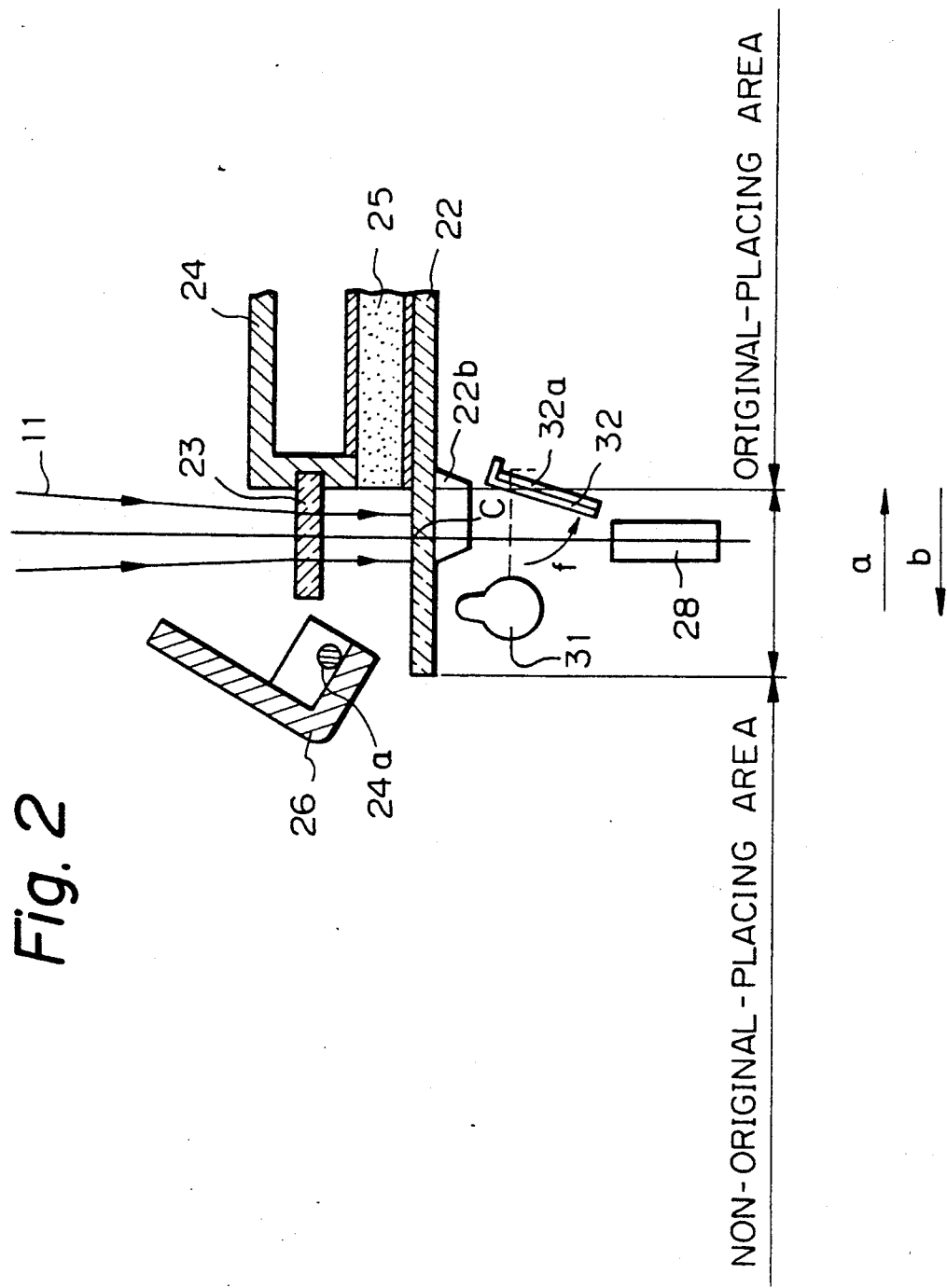

Fig. 3-A
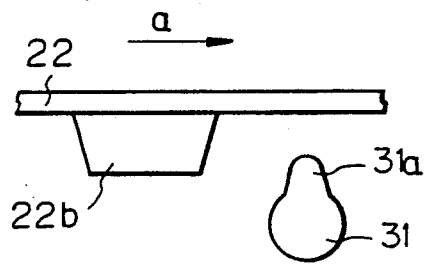
Fig. 3-B
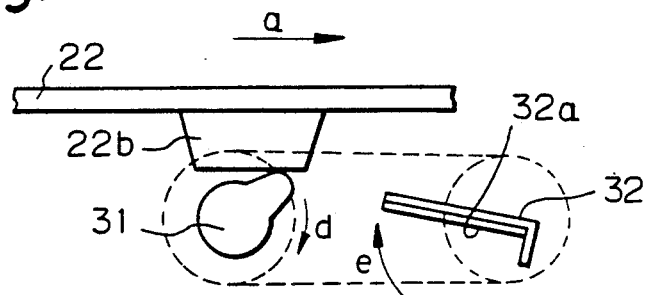
Fig. 3-C
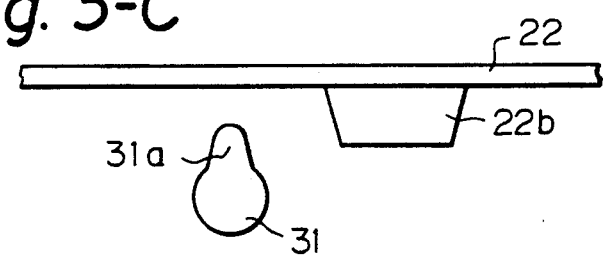
Fig. 3-D
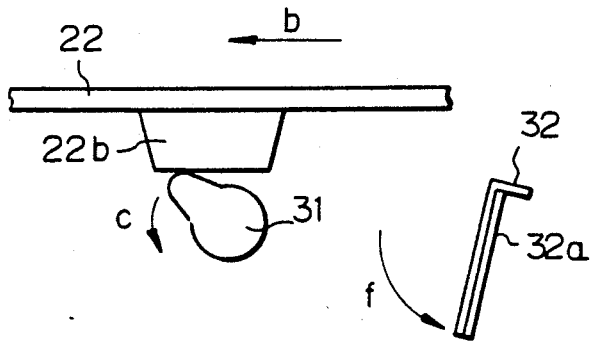
Fig. 3-E
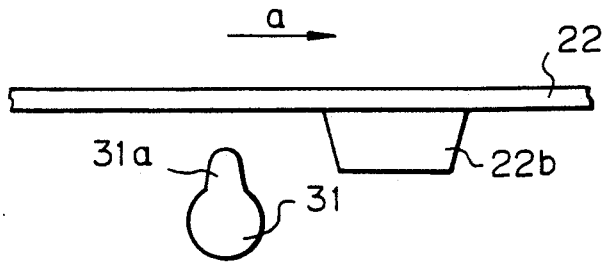

Fig. 4-A
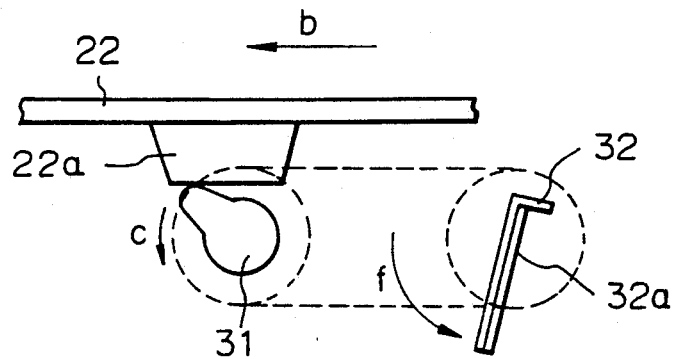
Fig. 4-B
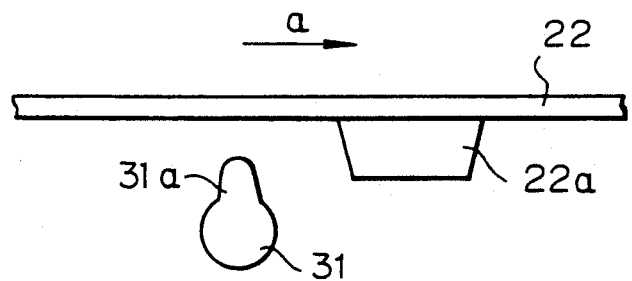
Fig. 4-C
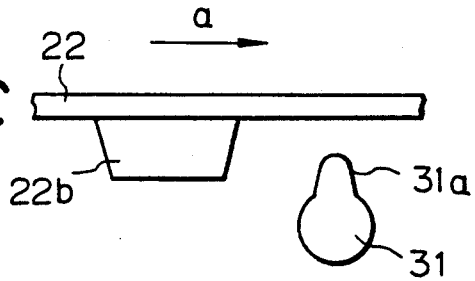
Fig. 4-D
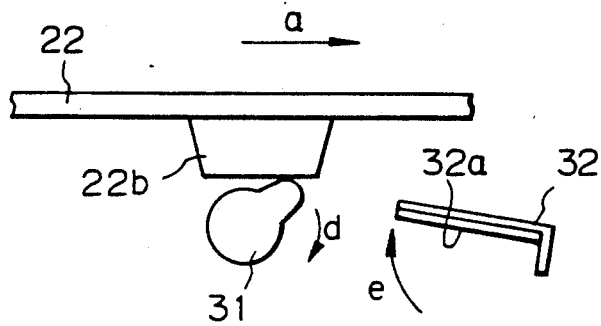

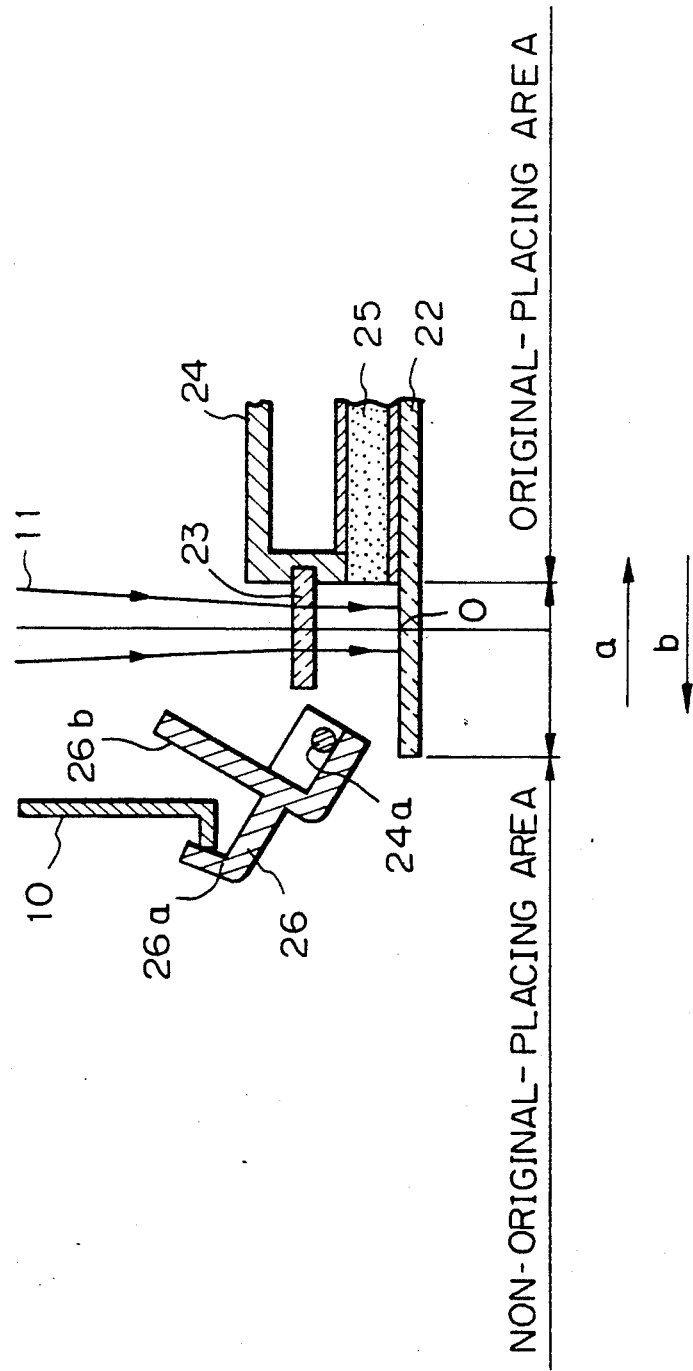

ELECTROPHOTOGRAPHIC COPYING APPARATUS FOR COPYING AN ORIGINAL PLACED ON AN ORIGINAL SUPPORTING TABLE AND FOR COPYING AN ORIGINAL FROM A BOARD SURFACE

This application is a continuation of application Ser. No. 07/118,885 filed Nov. 10, 1987 now abandoned.

BACKGROUND OF THE INVENTION

1. Field of the Invention

This invention relates to an electrophotograhic copying apparatus which is capable of copying by an image light entering from the exterior of the copying apparatus provided with a photosensitive member into the interior of the apparatus.

In particular, the present invention relates to an electrophotographic copying apparatus which is capable of copying both from a board surface on which recording can be effected by writing means and an original placed on an original supporting table.

2. Related Background Art

In recent years, along with the advance of the multifunctionalization of an electrophotographic copying apparatus, it has been devised to copy, besides an original placed on an original supporting table, the image information light of a microfilm, a slide film, a board surface or the like obtained outside of the apparatus body, by the electrophotographic copying apparatus body.

For example, there has recently been proposed a method of recording the information written on a board surface by the electrophotographic system. The methods of this type include a method whereby board-written information is directly imaged on the belt-like or drum-like photosensitive member of a conventional electrophotographic copying apparatus and is copied on a transfer material such as plain paper by the conventional electrophotographic process, and a method whereby boardwritten information is once imaged on a field lens provided on an original supporting table, and the formed image is re-imaged on the photosensitive member through an optical system in the electrophotographic copying apparatus and is transferred to a transfer material by the conventional process for copying.

Both of these methods are capable of copying from an original placed on the original supporting table and copying from board-written information onto plain paper and are improved in recording density as compared with the conventional digital system, and when multiple copies are to be obtained, there is no waste of time attributable to the copying speed if the board surface is once copied and then the transfer material obtained by that copying is secondarily copied as an original to be copied.

In electrophotogrpahic copying apparatuses, it has been a widely-employed practice to apply a light to a photosensitive member (hereinafter referred to as blank exposure) with a view to making the portions before and after the image area and the side edges, the leading end, etc. of copying paper into non-image areas to thereby prevent useless consumption of developer or obtain a desired blank portion.

As effective means for such blank exposure, the techniques of providing a shutter member (hereinafter referred to as the blank shutter) and using the light of an original illuminating light source to thereby eliminate the necessity of providing any special light source for blank exposure and achieve the compactness and reduced cost of the apparatus are proposed in U.S. Pat. No. 3,724,942, Japanese Laid-Open Patent Application No. 161258/1980 and Japanese Laid-Open Utility Model Application No. 18251/1983.

However, even in the aforedescribed electrophotograhic copying apparatuses capable of copying of the board surface or the like, blank exposure is necessary during the board surface copying mode.

It is conceivable to provide a blank shutter on the board surface side in order to effect blank exposure in the board copying mode, but this results in the bulkiness and higher cost of the apparatus.

In this regard, an apparatus of the movable original table type is conceivable as an image forming apparatus to be used. The apparatus of the movable original table type has a merit that since the imaging optical system in the image forming apparatus is fixed, information written on the board surface should only be imaged at the entrance of the imaging optical system and thus the construction of the board copying apparatus is simple. It is more preferable for the copying paper on which copying has been effected to come out in a direction perpendicular to the board surface because the user can take the copying paper easily and quickly. In such a case, the copying apparatus is disposed so that the direction of movement of the original table is substantially perpendicular to the board surface.

In the copying apparatus of the movable original table type, the original table is moved in the following sequence. First, in order to move the leading end of an original to the opening portion for original exposure, the original table is moved with the trailing end of the original as the head. This is called the back scan of the original table. When the leading end of the original comes to the opening portion for original exposure, exposure is effected from the leading end of the original and the original table is moved with the leading end of the original as the head. This is called the forward scan of the original table. When exposure is effected up to the trailing end of the original, the original table is returned to its initial position (home position) by the back scan.

As described above, in the copying apparatus of the movable original table type, there are a series of movements such as the back scan, forward scan and back scan of the original table and, therefore, if the direction of movement of the original table of the copying apparatus is disposed in a direction intersecting the board surface, the original table may sometimes protrude from the board surface during the back scan or during the forward scan, and this has led to the disadvantage that the original table interferes with or surprises the user who is board-writing or copying the board.

Also, in the above-described example of the prior art, for the formation of the optical path during the board copying mode, it has been necessary to remove a cover such as the pressure plate of the original table and use the apparatus with the glass of the original table maintained uncovered or to increase the movement distance of the original table and make the original table uncovered. It has also been necessary to shield the space between the board scanning apparatus and the copying apparatus from light to thereby prevent the information of the board surface from being disturbed and, moreover, where there is no pressure plate during the original copying mode, remarkable image deterioration has been brought about in the case of an original of light-transmitting material or an original of small size.

SUMMARY OF THE INVENTION

It is an object of the present invention to provide an apparatus which enables board-written image information to be copied by an electrophotogrpahic copying apparatus.

It is also an object to the present invention to provide an electrophotographic copying apparatus which effectively utilized a blank shutter provided in the electrophotographic copying apparatus to thereby solve the above-noted problems and can accomplish blank exposure reliably by a simple construction.

It is also an object of the present invention to provide a board copying apparatus which is capable of copying both image information written on a board surface and an original placed on the original table of the copying apparatus and which eliminates the above-noted disadvantages peculiar to the prior art when a copying apparatus of the movable original table type is adopted and which is easy for the user to manipulate.

It is also an object of the present invention to provide an electrophotogrpahic apparatus which eliminates the above-noted disadvantages peculiar to the prior art and enables the copying by the image information light from outside of the electrophotographic apparatus provided with an original table without making the apparatus bulky and without disturbing the image and which is simple and easy for the operator to manipulate.

The present invention which achieves the above objects is an electrophotogrpahic copying apparatus which is provided with a first body having a photosensitive member, a light source for exposing an original, an original supporting table movable relative to the light source with the original supported thereon, and a first optical system for projecting a first image information light reflected from the original onto the photosensitive member, and a second body having a second optical system for projecting a second image information light onto the photosensitive member in said first body and in which a first mode for copying by the first image information light and a second mode for copying by the second image information light are possible, and is characterized by control means for the second mode which positions the shutter member for blank exposure in the optical path in its retracted position prior to the copying in the second mode.

Another feature of the present invention is that the original table of the copying apparatus is moved to form an imaging optical path for directing the image information on a board surface into the copying apparatus and after the termination of the copying of the board surface, the original table is returned to the initial position and the original table is prevented as much as possible from protruding toward the board surface side.

Still another feature of the present invention is an electrophotographic copying apparatus provided with a light-intercepting mechanism characterized in that when a board is to be copied, a portion of a cover member for the board surface is opened and this opened portion and a light-intercepting member provided in the second body cooperate with each other to shield the optical path leading from the second body to the first body from light.

BRIEF DESCRIPTION OF THE DRAWINGS

FIG. 2 is a cross-sectional view of the essential portions of the FIG. 1 embodiment.

FIGS. 3-A, 3-B, 3-C, 3-D and 3-E are detailed views of a shutter opening-closing mechanism during the board copying mode.

FIGS. 4-A, 4-B, 4-C and 4-D are detailed views of the shutter opening-closing mechanism during the original copying mode for copying an original placed on an original table.

FIG. 7 is a detailed view illustrating the formation of an optical path during the board surface copying mode.

DESCRIPTION OF THE PREFERRED EMBODIMENTS

Figure 1:
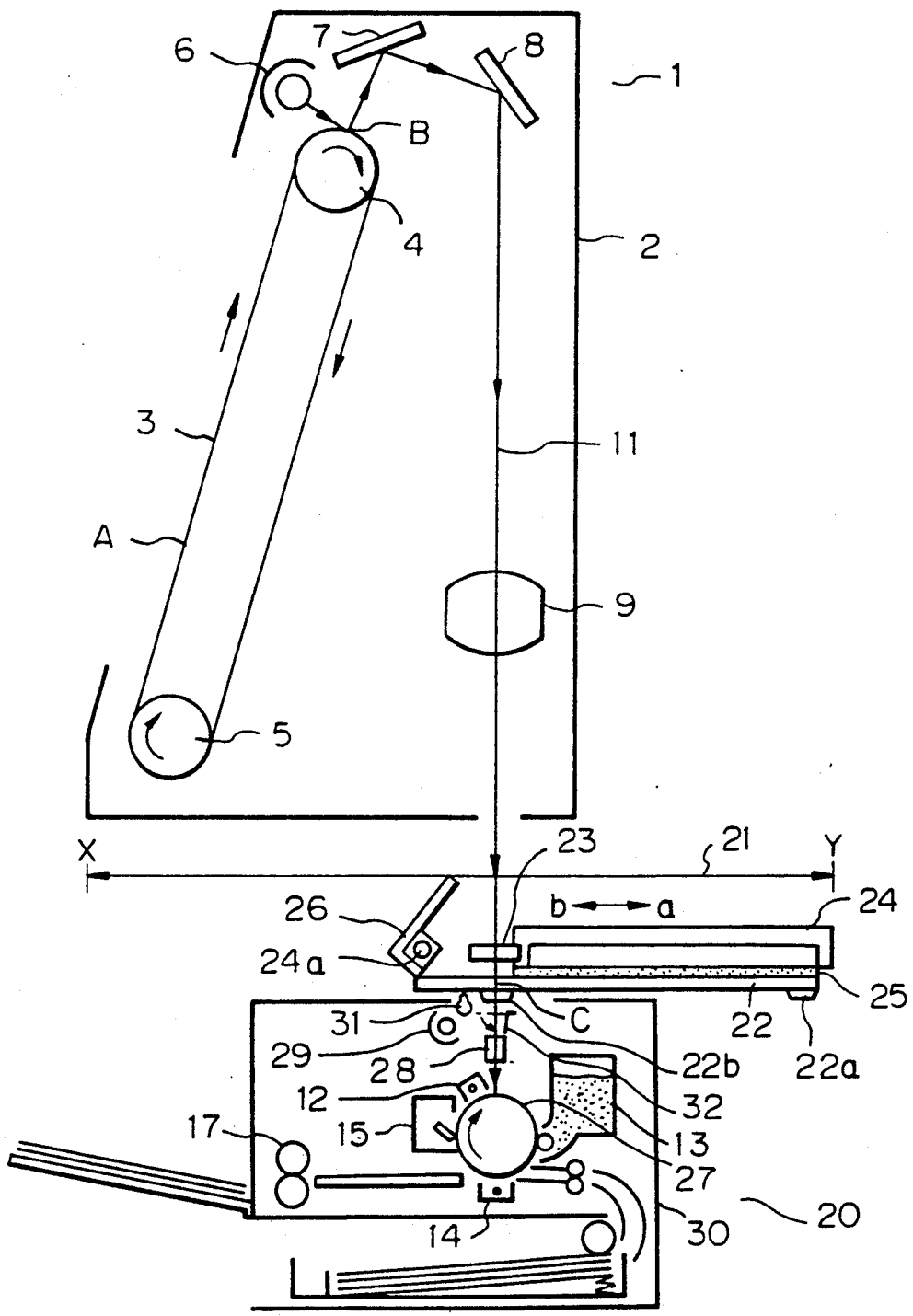
FIG. 1 is a cross-sectional view of a board copying apparatus according to an embodiment of the present invention.

FIG. 1 is a cross-sectional view of a boardwriting copying apparatus to which the present invention is applied, and FIG. 2 is a cross-sectional view of essential portions according to the present invention.

In a board scanning apparatus 1, a sheet 3 is a white or light-colored flexible board surface member such as a wide synthetic resin belt or the like and is extended between rollers 4 and 5. The board surface is vertically substantially planar and is movable by the rollers 4 and 5 being rotated in the direction of arrow, and information board-written at this time is scanned and projected onto a photosensitive member by an optical system which will be described later. Desired information is board-written on the sheet 3 at the side thereof designated by A by suitable writing means, and the board-written image information is illuminated and scanned at a station B by a lamp 6 with the rotation of the rollers 4 and 5.

The optical system is comprised of a first mirror 7, a second mirror 8 and a lens 9, and the light from the board surface illuminated by the lamp is reflected upwardly of the board surface at the scanning station B, is reflected downwardly through the intermediary of the first mirror 7 and the second mirror 8 disposed above the scanning station B and is projected onto a copying apparatus 20 through a lens.

In the box member 30 of the copying apparatus 20, there is a drum-shaped electrophotographic photosensitive member 27 rotatable in the direction of the enclosed arrow. Along the outer peripheral surface of the photosensitive member 27, there are provided a sensitizing charger 12, a developing device 13, a transfer charger 14 and a cleaning device 15, and on the other hand, means for supplying a transfer material to the position of the transfer charger 14 and a fixing device 17 for fixing a toner image transferred to the transfer material are also provided at predetermined locations, but these are well known and therefore need not be described.

A movable original table unit 21 on which an original is placed is mounted on top of the box member 30. In the original copying mode, an original to be copied such as a document is placed on the original table unit 21, and the unit 21 is moved forward in the direction of arrow a or b substantially perpendicular to the direction of movement of the sheet 3 from a position in which the left end of the original table unit as viewed in FIG. 1 is located at X to a position in which the right end of the original table unit is located at Y, whereby the original is scanned. When the scanning of the original is terminated, the original table is returned to its home position.

An openable-closable cover 26 is provided for introducing an optical image through a lens 9 into a copying apparatus 20 by an opening thereof, and for interrupting introduction of the optical image into the copying apparatus 20 so as to function as a shutter member.

In the board copying mode, the original table is to the position of FIG. 1 and in response to this movement, the openable-closable cover 26 is opened and the light from the board scanning position 1 can enter the copying apparatus 20, whereafter the light passes along the same optical path as in the copying apparatus, that is, passes through a short-focus imaging element array 28 and is directed to the photosensitive member.

Thereby, copying of the board surface becomes possible.

The copying apparatus 20 has a shutter changing-over lever 31 for effecting the change-over of the entry and retraction of a blank shutter 32 relative to the optical path, and engagement portions 22a and 22b projectedly provided on the scanning means (in the present embodiment, the original table) and adapted to engage the lever 31. The engagement portion 22b is provided at a location whereat the original table 21 is engaged with the lever 31 substantially at the terminal point of the forward movement in the original copying mode, and the engagement portion 22a is provided at a location whereat the original table in the original copying mode is engaged with the lever 31 between the home position and the scanning start point or substantially at the scanning start point.

Operation of the blank shutter 32 will now be described.

FIGS. 4-A to 4-D illustrate the operation of the blank shutter in the original copying mode.

During the scanning of the original, the image of the original placed on the table 21 is slit-exposed on the photosensitive member 27 by an imaging optical system which comprises a lens 28 disposed in the box member. This exposure position lies between the sensitizing charger 12 and the developing device 13. The above-mentioned imaging optical system projects onto the photosensitive member 27 the image of that portion of the original which lies at a position C which is a position fixed relative to the box member 30.

In FIG. 4-A, the original table 22 is first moved in the direction of arrow b from the central home position in the copying apparatus and the shutter changing-over lever 31 is brought down in the direction of arrow c by the engagement portion 22a provided on the original table 22. The lever 31 and the shutter 32 are coupled together by a well-known link mechanism, and the shutter 32 is operated in the direction of arrow f and retracted from the optical path of the copying apparatus. The shutter changing-over lever 31 is of an automatic return structure wherein when the state in which the shutter changing-over lever 31 is pushed by the shutter changing-over piece 22a as shown in FIG. 4-A is released as shown in FIG. 4-B, the portion 31a of the shutter changing-over lever 31 returns in a direction substantially perpendicular to the original table 22. In the state of FIG. 4-B, the optical path of the copying apparatus becomes open, and the image information light of the original slit-exposed by the exposure apparatus and placed on the original table of the copying apparatus is imaged on the photosensitive member and transferred to the transfer material by the conventional electrophotographic process, thus completing the copying. After the scanning of the image of the original placed on the original table of the copying apparatus is terminated, the original table is further moved in the direction of arrow a and, as shown in FIGS. 4-C and 4-D, the shutter changing-over lever 31 is brought down in the direction of arrow d by the engagement portion 22b provided on the original table 22, and the shutter 32 is operated in the direction of arrow e and white light is caused to enter the photosensitive member of the copying apparatus by the white portion, 32a of the shutter 32, whereby unnecessary consumption of the developer is avoided. The original table unit 21 of the copying apparatus 20 is comprised of the original table 22, a pressure plate 24, a pressure sheet 25 and an openable-closable cover 26.

The operation of the blank shutter in the board copying mode will now be described with reference to FIGS. 3-A to 3-E. In the board copying mode, the original table unit 21 is moved in the direction of arrow a and after the detection of the position in which the scanning of the original in the original copying mode has been completed, the operations of the afore-mentioned shutter mechanism shown in FIGS. 3-A to 3-E are performed. In FIG. 3-A, the original table 22 is still moved in the direction of arrow a after the detection of the aforementioned position in which the scanning of the original has been detected, and in FIG. 3-B, the shutter changing lever 31 is brought down in the direction of arrow d by the engagement portion 22b provided on the original table 22, and the shutter 32 operatively associated with the shutter changing-over lever 31 is moved in the direction of arrow e, thereby intercepting the optical path of the copying apparatus (hereinafter referred to as closing the shutter). The original table 22 is moved in the direction of arrow a without being stopped and is reverted at a position whereat as shown in FIG. 3-C, the portion 31a of the shutter changing over lever 31 automatically returns to its vertical position, and as shown in FIG. 3-D, the original table 22 is moved in the direction of arrow b, and the shutter changingover lever 31 is brought down in the direction of arrow c by the shutter changing-over piece 22b to move the shutter 32 in the direction of arrow f, thereby forming a second imaging optical system of the copying apparatus (hereinafter referred to as opening the shutter). In the state of FIG. 3-D, the original table 22 is stopped, and as shown in FIG. 3-E, the original table 22 is then moved in the direction of arrow a, and is further moved to the position shown in FIGS. 1 and 2 and stopped at this position. At this stop position, the openable-closable cover 26 is opened in response to the movement of the original table, and an optical path for connecting the board scanning apparatus and the copying apparatus together is formed to copy the board surface, and in said position C, the image of that portion of the board surface which is in the scanning position B is imaged on a field lens 23 disposed in contact with or in proximity to the original table, by the optical system in the board scanning apparatus 1. The image formed on this field lens 23 is projected onto the photosensitive member 27 through the lens 28. A similar operation is also performed where there is not present the field lens 23 and the board-written information is to be directly imaged on the photosensitive member of the copying apparatus.

After the scanning of the board surface is terminated, the original table 22 is moved in the direction of arrow b and an operation converse to the operation of opening the shutter 32 is performed.

That is, the operation of opening the shutter 32 as shown in FIG. 3-D is first performed and further, the original table 22 is moved in the direction of arrow b and is stopped at a position whereat the portion 31a of the shutter changing-over lever 31 can automatically return to a position substantially perpendicular to the direction of movement of the original table 22, and then the original table 22 is moved in the direction of arrow a as shown in FIG. 3-A and is stopped in the state in which the shutter 32 is closed as shown in FIG. 3-B, and subsequently the original table 22 is moved in the opposite direction of arrow b and is stopped at the home position of the original table unit 21.

The change-over between the movements of the original table 22 in the directions of arrows a and b is accomplished by providing a conventional solenoid or the like operated by the change-over between the board surface copying mode and the original copying mode in the original table drive transmitting system, and operating said solenoid or the like in the board surface copying mode to actuate a clutch for changing over the movements of the original table 22 in the directions of arrows a and b to be effected in the original copying mode.

The operation after this board copying process is for preventing the blank shutter from performing an operation converse to what has been described above by mistake in the next original copying or board copying cycle to interfere with the copying.

To perform the above-described operation, there can be provided control means such as a CPU which starts to operate upon receipt of a board copying mode signal.

Also, the control means for opening the blank shutter may be provided by depressing a button and forcibly holding the opened position or by the original table continuing to depress a switch in the predetermined copying position of the board-writing mode to thereby maintain the blank shutter opened.

In the above-described embodiment, however, the blank shutter can be reliably maintained opened during the board-writing mode without any new members being provided in the copying apparatus.

It is preferable that the optical paths in the copying apparatus in the board-writing mode and the original copying mode be identical to each other, but they may slightly deviate from each other if the blank shutter is in a position in which it can enter the both optical paths.

Further, the present invention is not restricted to an apparatus in which the original table is moved, but is applicable to any apparatus in which the original and the original exposing light source are movable relative to each other for scanning.

Also, the predetermined position in the board copying mode may be outside the scanning range in the original copying mode.

As described above, according to the present embodiment, by effectively using the shutter members in the copying apparatus, blank exposure can be accomplished in a plurality of copying modes reliably and without making the apparatus bulky or compact.

The following embodiment is such that in the copying apparatus as described above wherein the original table 22 is reciprocally moved out of the body of the apparatus, the original table 22 is prevented from protruding to the display side of the sheet 3 during the board-writing mode. More specifically, it is such that the range of movement of the original table 22 is changed between the copying apparatus mode and the boardwriting mode.

The present invention will hereinafter be described with respect to this embodiment.

Figure 5:
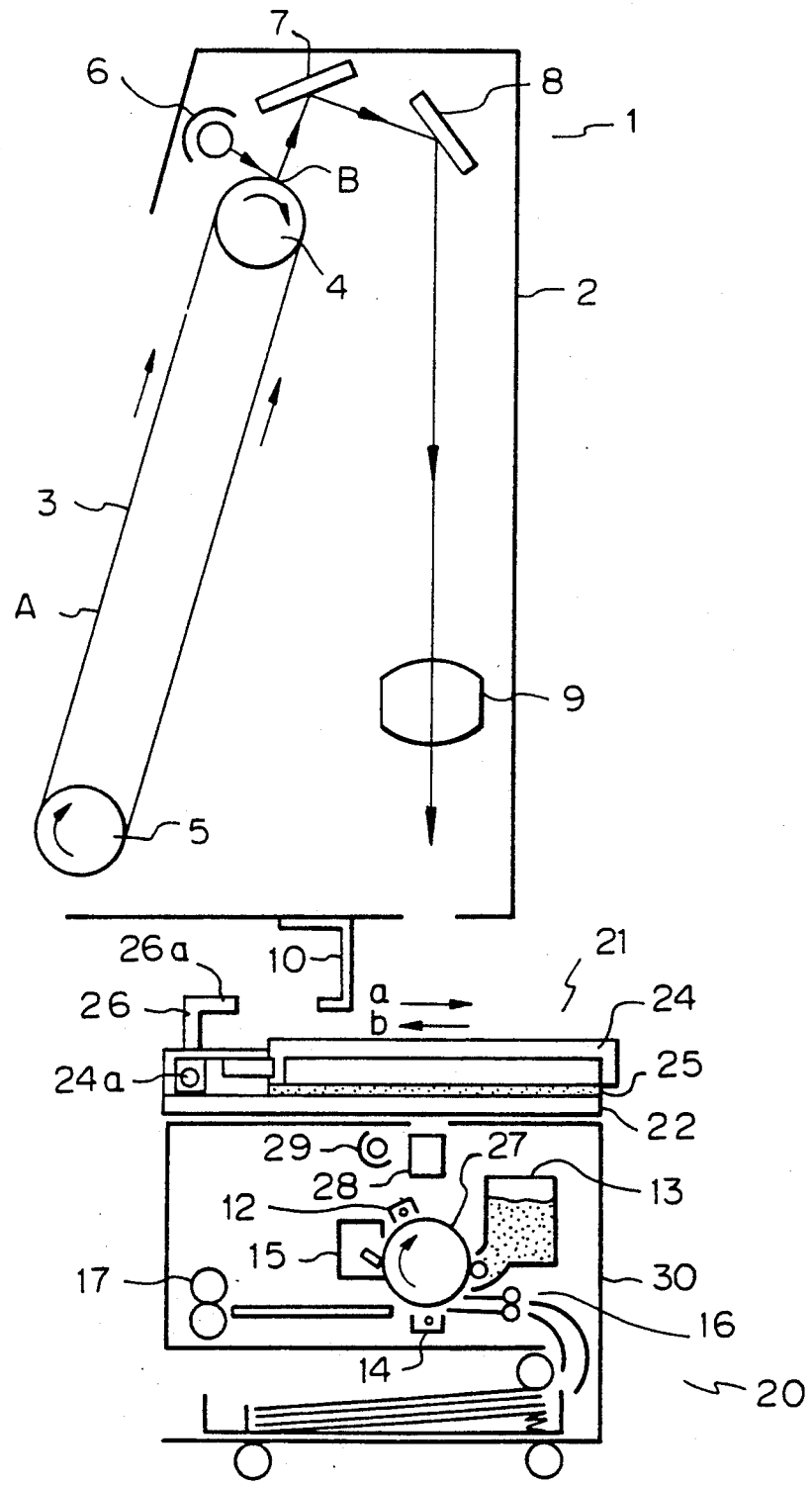
FIG. 5 is a schematic cross-sectional view showing the whole of the board copying apparatus of the present invention.

Referring to FIG. 5, in the board copying apparatus, the copying apparatus 20 has in a housing 30 a photosensitive member 27 rotatable in the direction of arrow. Along the outer peripheral surface of the photosensitive member 27, there are provided a charger 12, a lens 28, a developing device 13, a transfer charger 14 and a cleaning device 15 and, on the other hand, means 16 for supplying a transfer material to the position of the transfer charger 14 and a fixing device 17 for fixing a toner image transferred to the transfer material are also provided at predetermined locations.

In the board-writing mode, an original table 21 is first moved in the direction of arrow a in FIG. 5 and the portion 26a of a dust-proof openable-closable cover 26 rotatably supported by the portion 24a of a pressure plate 24 is caught by a clamp arm 10 supported by the cover 2 of the board scanning apparatus 1. The portion 26a is formed at a portion of cover 26 integrally therewith for engaging a clamp 10 so as to unction as an engaging portion. The openable-closable cover 26 is rotated counter-clockwise to form the optical path in the board-writing mode (FIG. 6).

Figure 6:
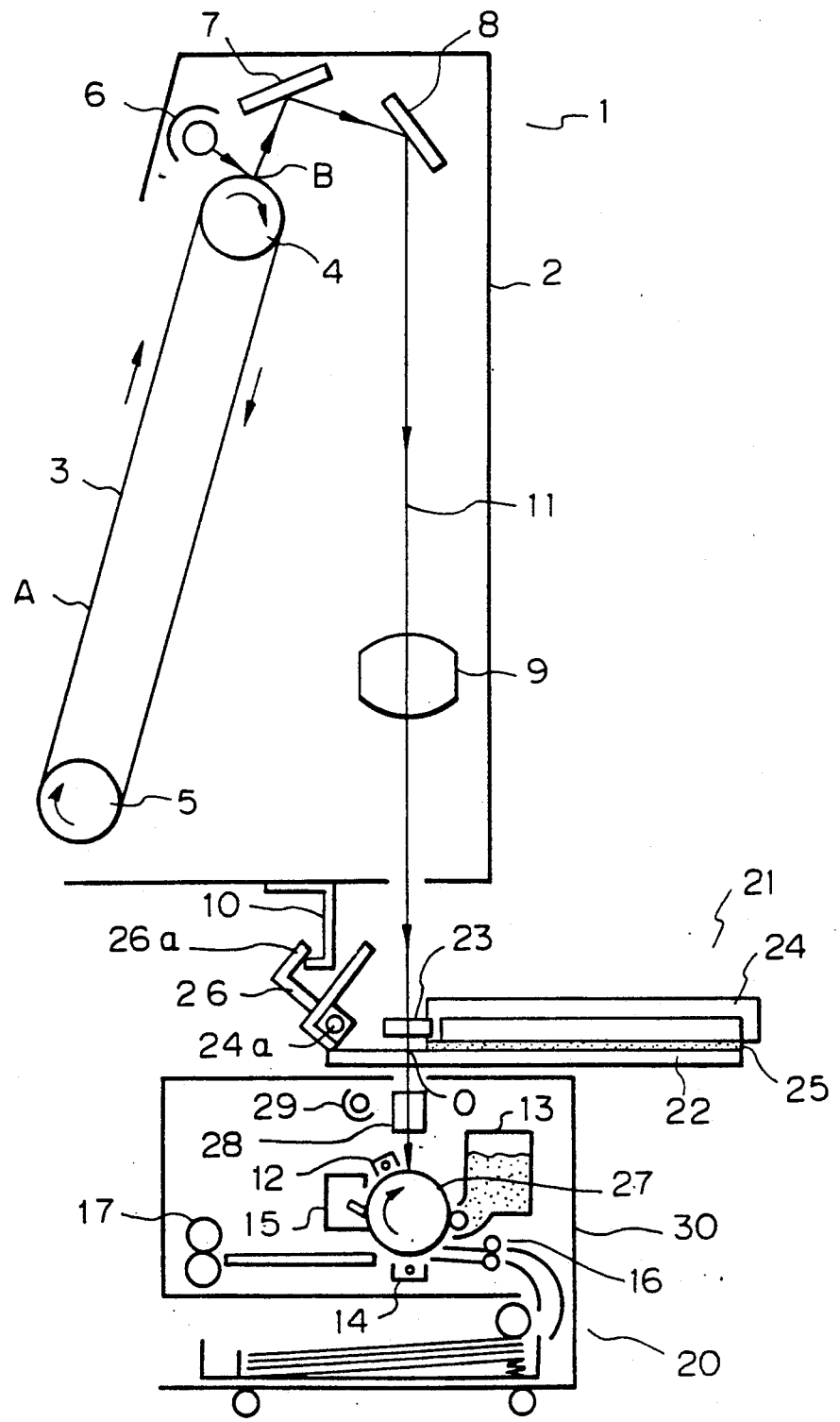
FIG. 6 is a schematic cross-sectional view illustrating the state of the board copying apparatus during the board surface copying mode.

At the position 0 in FIG. 6, the image of the board surface lying at the scanning position B which is formed on the glass 22 of the original table through a field lens 23 disposed in proximity to the glass 22 of the original table is projected onto the photosensitive member 27 through the lens 28.

In FIG. 7, after the termination of the scanning of the board surface, the original table 21 is moved in the direction of arrow b indicated in FIG. 5 and the clamp arm 10 pushes the portion 26b of the openable-closable cover 26, whereby the openable-closable cover 26 is rotated clockwise and the optical path is closed.

Next, in the original copying mode, an original to be copied such as a document is placed on the glass 22 of the original table by means of the pressure plate 24 and pressure sheet 25. The original table 21 is first moved in the direction of arrow b to bring the fore end of the original to the exposure opening portion, whereafter it is moved in the direction of arrow a and the original-placing area thereof is exposure-scanned by a lamp 29. When the scanning of the original is terminated, the original table 21 is returned to its home position (FIG. 5).

Figure 8:
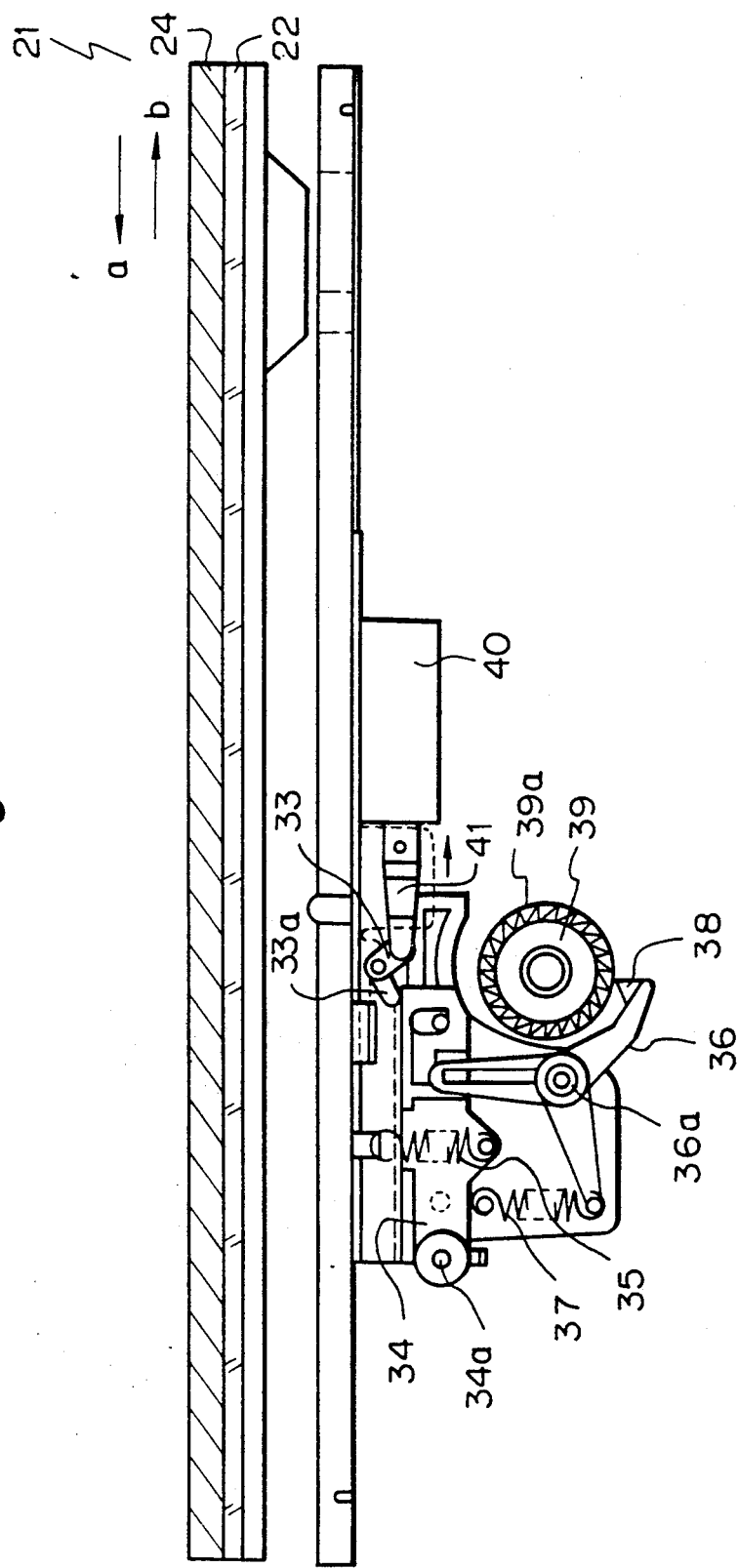
FIG. 8 is a front view of the original table driving unit the copying apparatus.

FIG. 8 is a front view of a driving unit for driving the original table 21 of the copying apparatus 20. In FIG. 8, the reference numeral 40 designates a solenoid which is normally deenergized and is energized when a copy button (not shown) on the board surface side is depressed during the board surface copying mode. The reference numerals 41 and 33 denote levers connected to the solenoid 40.

The lever 33 has its end 33a bearing against a lever 34 which is biased counter-clockwise by a spring 35. The lever 34 is engaged by a lever 36 which is biased counter-clockwise by a spring 37. The lever 36 has a pawl 38 formed at the end thereof and is disposed at such a location that when rotated, it engages a clutch 39 having a ratchet 39a. The clutch 39 is the forward clutch of the original table 21.

When the board-writing mode is selected by the selection of a switch (not shown), if the copy button on the board surface side is depressed, the solenoid 40 is engaged and the lever 41 is pulled in the direction of arrow and the lever 33 is rotated counter-clockwise to thereby depress the lever 34 so as to rotate clockwise about a pivot shaft 34a. Thereupon, the lever 36 which is in engagement with the lever 34 is pushed and rotated counter-clockwise about a pivot shaft 36a, whereby the pawl 38 of the lever 36 comes into engagement of the pawl portion of the clutch 39. The original table 21 immediately assumes the forward scan state and is moved in the direction of arrow a in FIG. 5 and is stopped in the state of FIG. 6, and the board surface is scanned. When the scanning is terminated and the copying is terminated, the original table 21 is moved in the direction of arrow b by a signal and is stopped at its home position, and thus the state shown in FIG. 5 is brought about.

Figure 9:
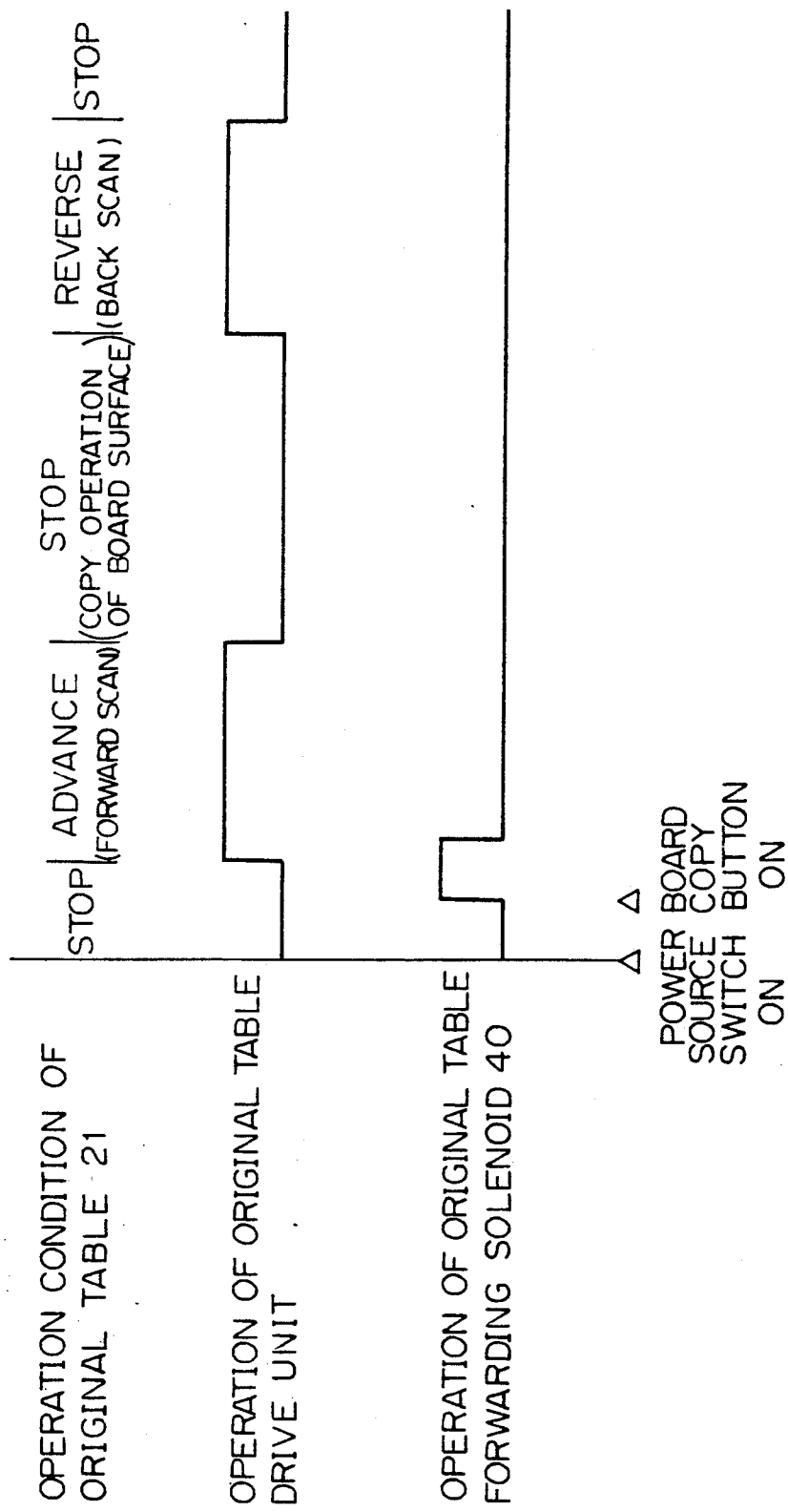
FIG. 9 is a timing chart showing the movement of the original table during the board surface copying mode.

FIG. 9 is a timing chart showing the movement of the original table 21 and the operations of the original table driving unit and the original table forwarding solenoid 40 when the board copy button on the board surface side is depressed during the board surface copying mode.

When the mode is to be changed from the board copying mode to the original copying mode, the copying apparatus 20 is drawn out from below the board scanning apparatus 1. Thereupon, the board copying mode is changed over to the original copying mode by means such as a microswitch, not shown. At this time, even if the copy button of the copying apparatus 20 is depressed, the solenoid 40 is not operated and therefore, the original table 21 of the copying apparatus 20 first back-scans (advances in the direction of arrow b in FIG. 5) to bring to fore end of the original to a position right above the lens 28, and then forward-scans (advances in the direction of arrow a in FIG. 5) to scan the original. When the scanning is terminated and the copying is terminated, the original table again back-scans (advances in the direction of arrow b) and is stopped at its home position. That is, just the same operation as that of the copying apparatus of the movable original table is performed, whereby the original is copied.

Figure 10:
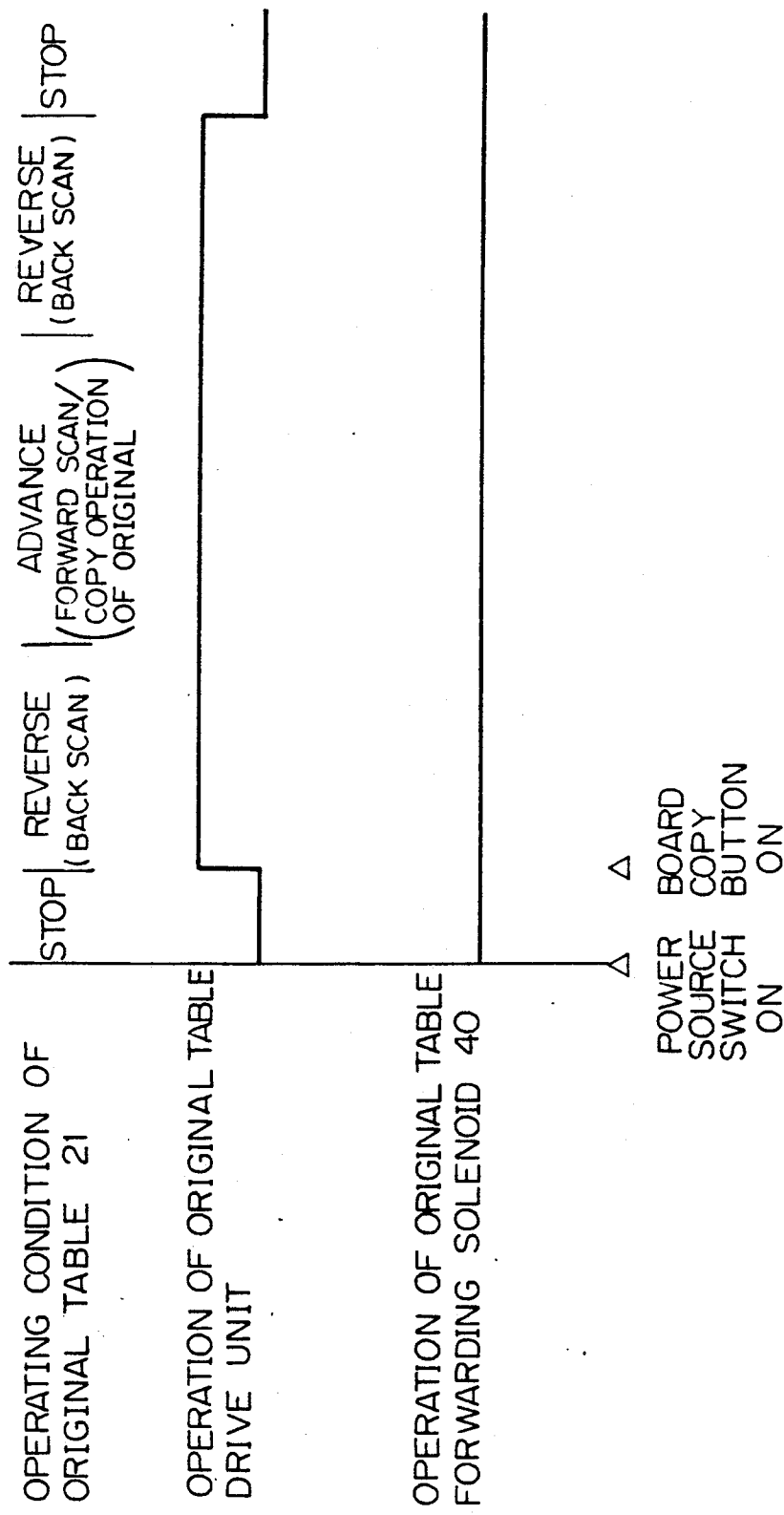
FIG. 10 is a timing chart showing the movement of the original table during the original copying mode.

FIG. 10 is a timing chart showing the movement of the original table 21 and the operation of the original table driving unit when a copy button attached to the copying apparatus is depressed during the original copying mode. (The original table forwarding solenoid 40 works only when a board copy button is depressed, and is not operated by the copy button of the copying apparatus 20 and thus does not work at this time).

Even if the copying apparatus 20 is not drawn out from the board scanning apparatus 1 during the original copying mode, it will suffice if the solenoid 40 is not energized, and in such a case, of course, the copy button may be depressed with an original placed on the glass 22 of the original table in the state of FIG. 5 and the original may be copied. In such case, during the board surface copying mode, the amount by which the original table protrudes toward the board surface side may be reduced as compared with that during the original copying mode.

In short, during the board surface copying mode, the first back scan of the original table need not always be inhibited, and as compared with the case of the ordinary original copying mode, the amount of the first back scan of the original table may be reduced during the board surface copying mode to thereby prevent the original table from protruding very much toward the board surface side.

As described above, according to the present embodiment, it has become possible to provide a board copying apparatus which is capable of copying both the image information written on the board surface and the original placed on the original table of the copying apparatus and in which the mode of the original table may be changed between the board surface copying mode and the original copying mode to thereby prevent the original table from protruding from the board surface during the board surface copying to interfere with the user.

Also, in the board copying apparatus as described above, the board scanning apparatus 1 and the copying apparatus 20 are moved relative to each other each time the mode is changed and thus, the two are disposed in opposed relationship with each other with a gap therebetween. Therefore, the optical path portion between the two apparatuses is exposed to external light and thus, it is conceivable that other light than the image information may reach the electrophotographic photosensitive drum to deteriorate the quality of image.

The following embodiment solves this problem and will hereinafter be described with reference to the drawings.

Figure 11:
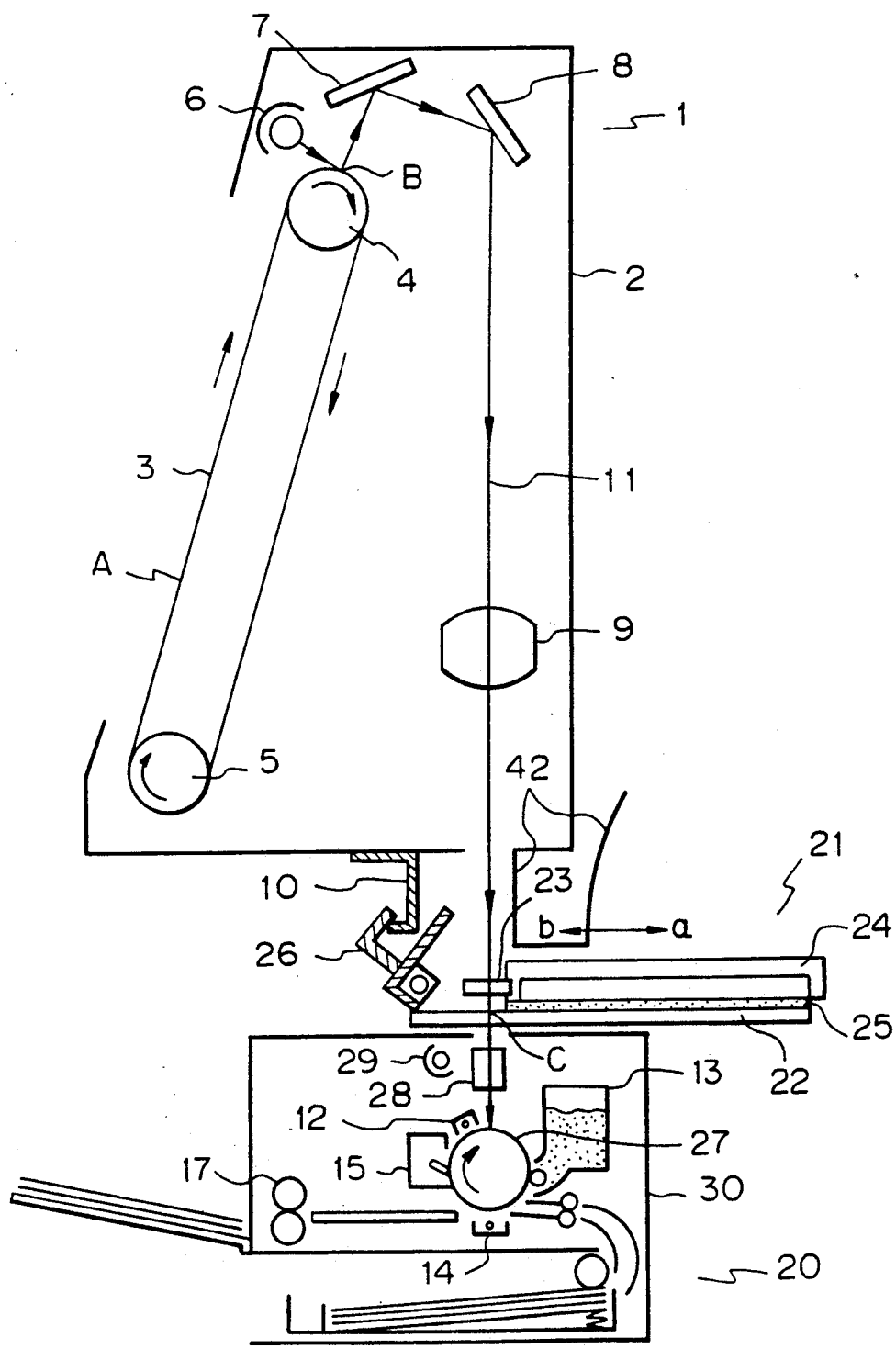
FIG. 11 is a general cross-sectional view of an embodiment of the present invention.
Figure 12:
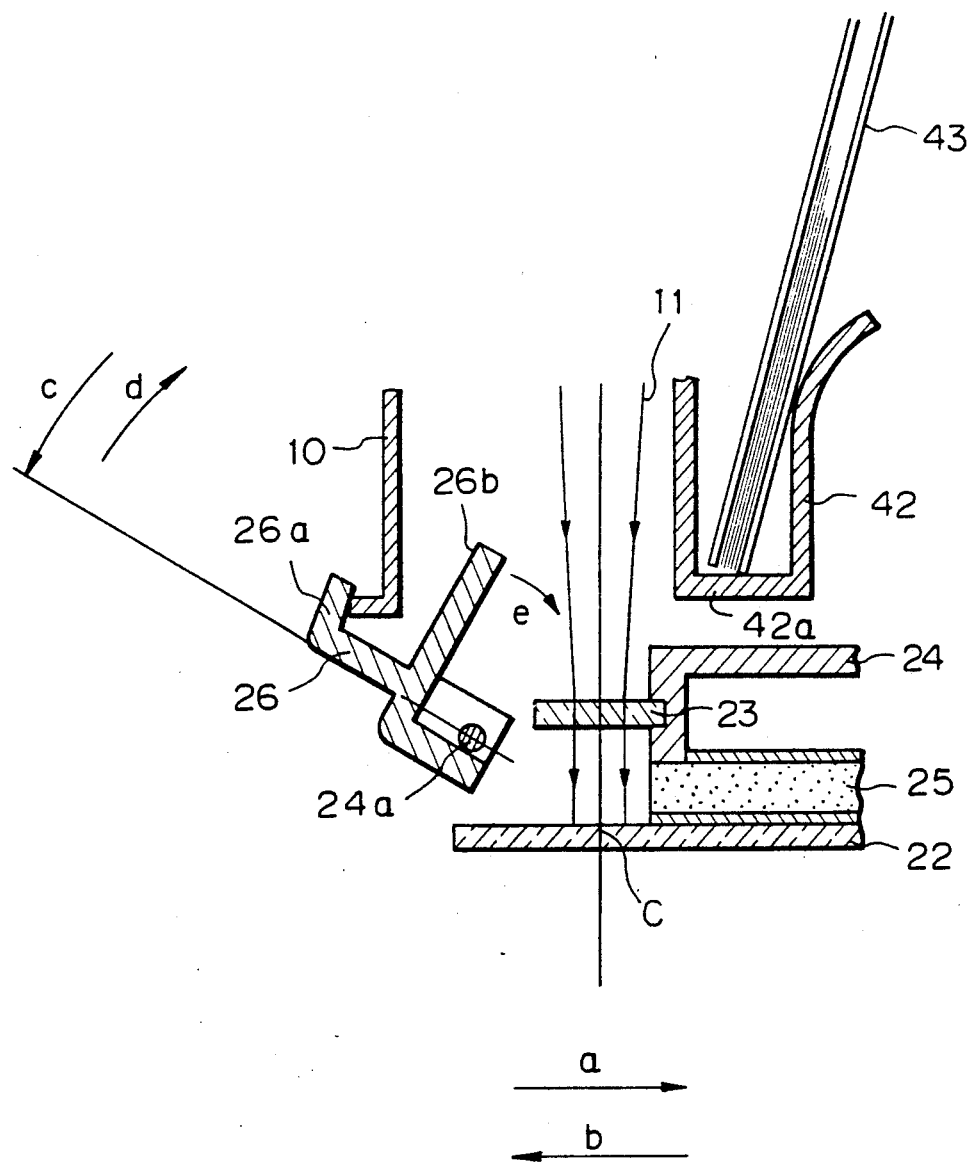
FIG. 12 is an enlarged sectional view of the connecting portion of the optical path.

In the state of FIGS. 11 and 12, the openable-closable cover 26 is stopped by the gravity being applied to the side indicated by arrow e. If the openable-closable cover 26 should be brought down toward that side opposite to arrow e, the clamp arm 10 will come into engagement with the portion 26b, whereby the stopped state of the openable-closable cover 26 will be kept.

Further, in this state of the board surface mode, the optical path is intercepted by the clamp arm 10, the openable-closable cover 26 and a light-intercepting member 42. That is, the harmful light from the front face of the board copying apparatus is automatically intercepted in response to the opening movement of the openable-closable cover 26 by the clamp arm 10 and the openable-closable cover 26 functioning also as a light-intercepting member.

Also, as regards the harmful light from the back side of the board copying apparatus, the light-intercepting effect is further increased because the light-intercepting member 42 has a portion 42a having width in the direction of movement of the original table and effecting is interception of light.

In the present embodiment, a space is provided which uses the portion 42a for the increased light-intercepting effect to enable a guide book 43 or the like to be held in the light-intercepting member 42, and the light-intercepting member 42 is used also as a chamber for containing a book or the like therein. After the termination of the scanning of the board surface, the original table 21 is automatically moved in the direction of arrow b and the openable-closable cover 26 is rotated in the direction of arrow d from gravity or by the portion 26b thereof being pushed by the clamp arm 10, whereby the optical path for directing the light from the board side into the copying apparatus is closed.

Also, by moving the board scanning apparatus 1 instead of moving the original table of the copying apparatus during the board surface copying mode as shown, the openable-closable cover 26 can be operated for opening or closing and the optical path from the first imaging optical system of the board scanning apparatus 1 can be formed. In the case of a board-writing apparatus, however, large drive source is required for the movement of the board-writing apparatus and therefore, it is preferable to move the original table to thereby open the openable-closable cover. In such case, it is preferable that the drive source for the automatic movement of the original table by the above-described board-writing mode setting is used also as a drive source for reciprocally moving the original table when the board writing apparatus is operated as a copying apparatus.

The above embodiment has been described as using a field lens, but where imaging can be effected directly on the photosensitive member by the projection means of the writing apparatus, the field lens is not necessary but may be replaced by a mere window or a light-transmitting member of glass, acryl, polycarbonate or like material.

Figure 13:
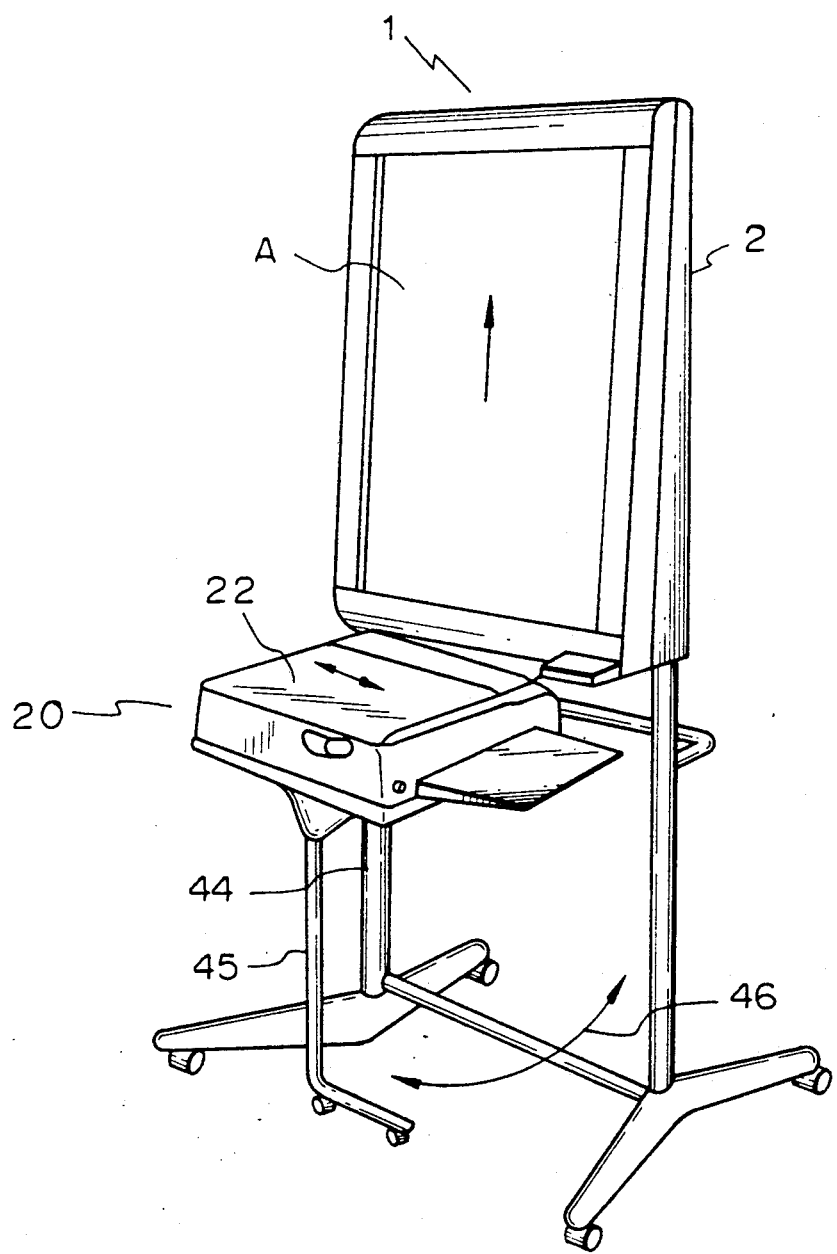
FIG. 13 illustrates the changes of the portion of the apparatus in the board copying mode and the original copying mode.

FIG. 13 illustrates the positional relationship between the copying apparatus 22 and the scanning apparatus 1 in the original copying mode and the board copying mode. The state of FIG. 13 shows the original copying mode, and from this state, the support stand 45 of the copying machine 20 which is rotatably supported by a shaft 44 is rotated in the counter-clockwise direction of arrow 46, whereby the copying machine 20 comes to lie under the scanning apparatus. Thus, the board copying mode shown in FIG. 1 is brought about. Conversely, when the mode is to be changed over from the board copying mode to the original copying mode, the support stand 45 is rotated in the clockwise direction of arrow 46 to assume the position shown.

The arrow on the original table 22 indicates the direction of movement of the original table.

We claim:

1. An apparatus for directing an image formed on a recording medium to an electrophotographic copying apparatus and obtaining a copy, said apparatus comprising:
   a first body having:
     an electrophotographic photosensitive member,
     a light source for exposing an original;
     an original supporting table reciprocally movable with the original supported thereon;
     a first optical system for projecting first image information reflected from the original onto said photosensitive member; and
     a first shutter member movably provided to assume an entrance position and a retracted position relative to an optical path of said first optical system and actuated by movement of said original supporting table, said first shutter member having a reflective portion for reflecting a uniform light from said light source to said photosensitive member when in said entrance position; and
   a second body having:
     a movable recording medium;
     a second optical system for projecting second image information which corresponds to image information on said movable recording medium onto said photosensitive member of said first body; and
     a second shutter member located at an end of said original supporting table and mounted so as to move between an open position for opening a light path of said second optical system and a closed position for closing the same,
     wherein said second shutter is set to an erect position when in the opened position,
   wherein said first body is shiftable relative to said second body between a first mode where said first image information is projected onto said photosensitive member and a second mode where said second image information is projected onto said photosensitive member,
   wherein when said first shutter member is at said entrance position said reflecting portion reflects the uniform light from said light source to said photosensitive member and when said first shutter member is at said retracted position said first image information or said second image information is projected onto said photosensitive member, and
   wherein said second shutter member moves to said open position for opening the light path for said second image information from said second optical system to said photosensitive member during movement of said original supporting table in said second mode.

2. An apparatus according to claim 1, wherein said first shutter member has been moved to said retracted position by the movement of said original supporting table by the time when the optical path of said second optical system is made coincident with the optical path of said first optical system.

3. An apparatus according to claim 1, further comprising a rising wall member rising in a coupled area of said first and second optical systems of said first and second bodies when said first optical system of said first body and said second body are made coincident with each other, wherein a wall member opposed to said rising wall member and provided in said second body with an optical path intervened therebetween is positioned in the coupled area of the optical systems of said first body and said second body, and said second shutter member is attached to said wall member.

4. An apparatus for directing an image formed on a recording medium to an electrophotographic copying apparatus and obtaining a copy, said apparatus comprising:
   a first body having:
     an electrohpotographic photosensitive member;
     a light source for exposing an original;
     an original supporting table reciprocally movable with the original supported thereon;
     a first optical system for projecting first image information reflected from the original onto said photosensitive member; and a first shutter member movably provided to assume an entrance position and a retracted position relative to an optical path of said first optical system and actuated by movement of said original supporting table, said first shutter member having a reflective portion for reflecting a uniform light from said light source to said photosensitive member when in said entrance position; and a second body having:
a movable recording medium;
a second optical system for projecting second image information which corresponds to image information on said movable recording medium onto said photosensitive member of said first body;
a second shutter member located at an end of said original supporting table and mounted so as to move between an open position for opening a light path of said second optical system and a closed position for closing the same; and
an engaging portion provided to engage with and move said second shutter member, wherein said second shutter is set to an erect position when opened by engaging the engaging portion at the open position; and control means for changing the movement of said original supporting table during a second mode to a movement within a range in which the movement area of said original supporting table is narrower than the movement area thereof when copying is effected in a first mode, wherein said first body is shiftable relative to said second body between said first mode where said first image information is projected onto said photosensitive member and said second mode where said second image information is projected onto said photosensitive member, wherein when said first shutter member is at said entrance position said reflecting portion reflects the uniform light from said light source of said photosensitive member and when said first shutter member is at said retracted position said first image information or said second image information is projected onto said photosensitive member, and wherein said second shutter member moves to said open position for opening the light path for said second image information from said second optical system to said photosensitive member by engaging with said engaging portion during movement of said original supporting table in said second mode.

5. An apparatus according to claim 4, wherein the movement range of said original supporting table is narrower in a direction in which said original supporting table does not protrude toward the recording medium to the utmost.

* * * * *

UNITED STATES PATENT AND TRADEMARK OFFICE
CERTIFICATE OF CORRECTION

PATENT NO. : 5,032,868
DATED : July 16, 1991
INVENTOR(S) : FUMIO NISHINO ET AL.   Page 1 of 3

It is certified that error appears in the above-identified patent and that said Letters Patent is hereby corrected as shown below:

On the Title Page, Item [75]

"Koyokazu Namekata," should read --Kiyokazu Namekata,--.

COLUMN 1

Line 13, "electrophotograhic" should read --electrophotographic--.
Line 41, "boardwritten" should read --board-written--.
Line 57, "electrophotogrpahic" should read --electrophotographic--.

COLUMN 2

Line 7, "electrophotogr-" should read --electrophotographic--.
Line 8, "pahic" should be deleted.

COLUMN 3

Line 7, "electrophotogrpahic" should read --electrophotographic--.
Line 11, "utilized" should read --utilizes--.
Line 25, "electrophotogrpahic" should read --electrophotographic--.
Line 33, "electrophotogrpahic" should read --electrophotographic--.

COLUMN 4

Line 33, "portion" should read --position--.
Line 39, "boardwriting" should read --board-writing--.

UNITED STATES PATENT AND TRADEMARK OFFICE
CERTIFICATE OF CORRECTION

PATENT NO. : 5,032,868
DATED : July 16, 1991
INVENTOR(S) : FUMIO NISHINO ET AL.

It is certified that error appears in the above-identified patent and that said Letters Patent is hereby corrected as shown below:

COLUMN 5

Line 26, "is to" should read --is moved to--.

COLUMN 6

Line 29, "white portion, 32a" should read --white portion 32a--.
Line 41, "afore-men-" should read --aforemen- --.
Line 57, "changing over" should read --changing-over--.
Line 60, "changingover" should read --changing-over--.

COLUMN 8

Line 22, "boardwriting" should read --board-writing--.
Line 44, "unction" should read --function--.

COLUMN 9

Line 54, "to fore end" should read --the fore end--.

COLUMN 10

Line 66, "is" should read --the--.

COLUMN 11

Line 58, "member," should read --member;--.

UNITED STATES PATENT AND TRADEMARK OFFICE
CERTIFICATE OF CORRECTION

PATENT NO. : 5,032,868
DATED : July 16, 1991
INVENTOR(S) : FUMIO NISHINO ET AL.        Page 3 of 3

It is certified that error appears in the above-identified patent and that said Letters Patent is hereby corrected as shown below:

COLUMN 12

Line 62, "electrohpotographic" should read
--electrophotographic--.

Signed and Sealed this

Tenth Day of May, 1994

Attest:

BRUCE LEHMAN

*Attesting Officer*     *Commissioner of Patents and Trademarks*